United States Patent [19]

Macheboeuf

[11] Patent Number: 4,580,158
[45] Date of Patent: Apr. 1, 1986

[54] VIDEO SIGNAL COMBINING SYSTEM

[75] Inventor: Guy Macheboeuf, Vitry-sur-Seine, France

[73] Assignee: Telediffusion de France, Paris, France

[21] Appl. No.: 494,282

[22] Filed: May 13, 1983

[30] Foreign Application Priority Data

May 17, 1982 [FR] France ............... 82 08568

[51] Int. Cl.$^4$ ............................... H04N 9/79
[52] U.S. Cl. ........................ 358/22; 358/183
[58] Field of Search ................ 358/22, 183

[56] References Cited

U.S. PATENT DOCUMENTS

| | | | |
|---|---|---|---|
| 3,778,542 | 12/1973 | Hanseman | 178/5.4 R |
| 4,007,487 | 2/1977 | Vlahos | 358/22 |
| 4,267,560 | 5/1981 | Ishikawa et al. | 358/22 |
| 4,292,649 | 9/1981 | Macheboeuf | 358/22 |
| 4,496,966 | 1/1985 | Hausdorfer et al. | 358/22 |

Primary Examiner—Michael A. Masinick
Attorney, Agent, or Firm—Lowe, King, Price and Becker

[57] ABSTRACT

A television system combines signals representing a picture derived from a foreground scene moving in front of a backing, with a background scene. An input processing circuit mixes a color from the background scene, preferably different from the backing color, with certain colors in the composite foreground and backing picture. A first combiner responsive to the picture and background scene representing signals determines picture zones where false colors are created at transition points between the foreground scene and the backing. At transitions, e.g. a transparent object, between the foreground and background scenes in the resultant picture transmitted by the system, the colors are modified progressively such that a viewer no longer sees the edges or the reflections due to the backing, but rather a slight blur blending perfectly with the background and foreground scene colors.

10 Claims, 5 Drawing Figures

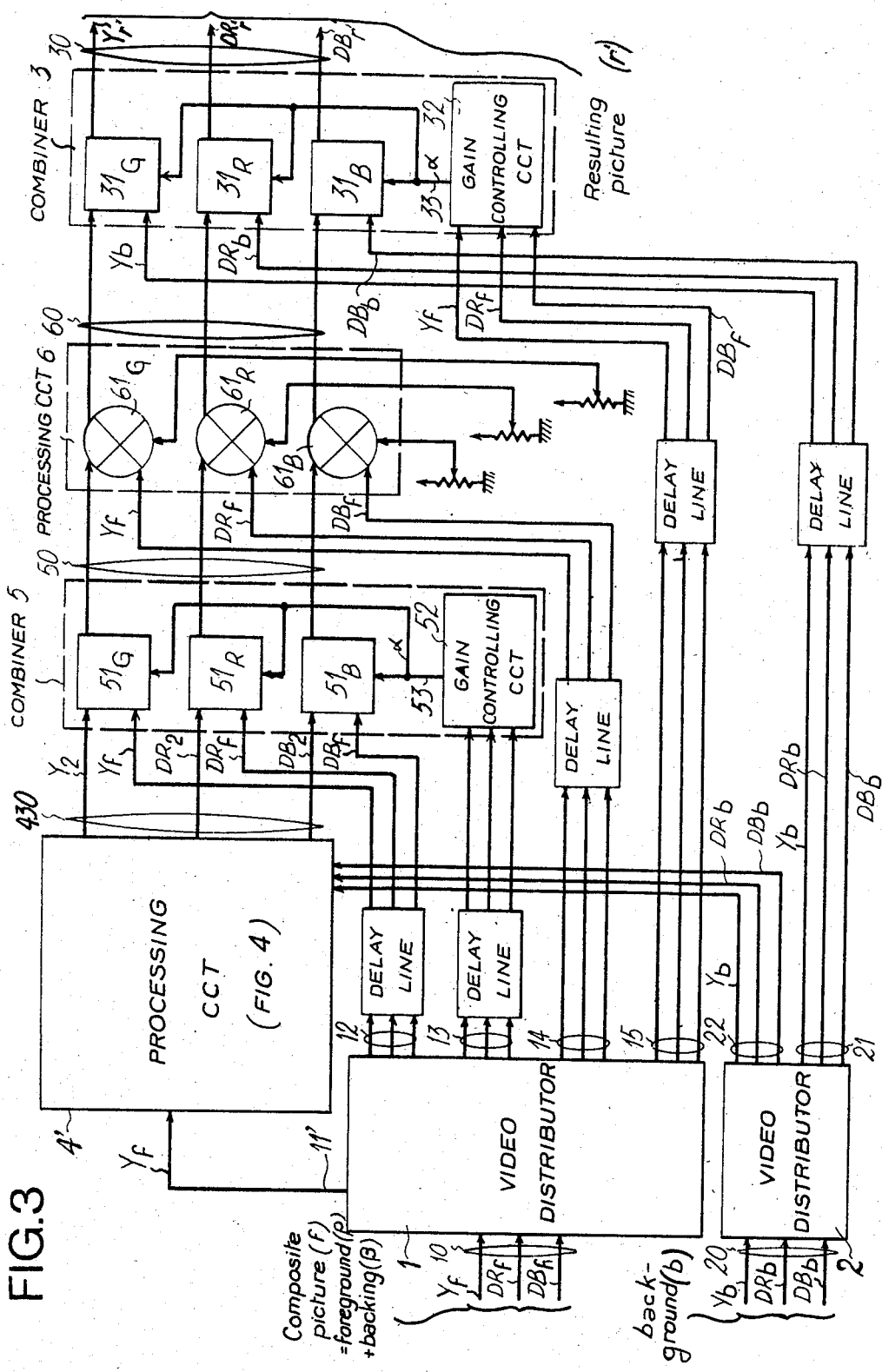

VIDEO SIGNAL COMBINING SYSTEM

BACKGROUND OF THE INVENTION

1. Field of the Invention

The present invention relates to a video signal combining system in which first component video signals representing a trichromatic composite foreground scene and backing picture and second component video signals representing a trichromatic background scene picture are combined electronically to produce output component video signals representing a resulting combined picture resulting from the replacement of the backing by the background scene in the trichromatic composite picture. The combining system comprises output means for combining, i.e. inserting a picture issued from the foreground scene in the background scene in terms of colors differences in the foreground scene and the backing.

2. Description of the Prior Art

In the known combining systems, such as those disclosed in the U.S. Pat. Nos. 4,292,649, 3,778,542, 4,007,487, the published German Patent Application 2,749,154 and the published French Patent Application 2,128,156, the component video signals in said picture resulting from the foreground scene are obtained either directly from corresponding component video signals representing the foreground scene, via respective attenuators sometimes variable, or from at least one linear combination of component video signals representing the foreground scene. The known systems differentiate between the generally saturated color of the backing and the foreground scene colors so as to provide a gain controlling signal intended for distinguishing the backing from the foreground scene with a view to doing away with the backing and replacing the backing by the background scene.

For various reasons, particularly operational ease, the color in the backing which is the back-cloth to the foreground scene or object is highly saturated. In the very large majority of cases, blue is adopted. The component video signals representing the composite picture made up the foreground scene and the backing are delivered by a film camera on a deck where the foreground scene or object is positioned in front of a blue panel at the back of a studio and moves on a blue floor. The overall lighting must be such that a very regular backing color may be achieved. However, considerable reflected and diffused light occurs stemming from the panel and the floor. This light has a dominance of blue and gives rise in the foreground scene or object to, on the one hand, numerous blue reflections which detract from the natural aspect of the real colors in the foreground scene picture and, on the other hand, an edging which becomes more marked especially around the hair of a person in the foreground. The edging can again appear after combination in the foreground scene and background scene transition. A bluish transparency analogous to the edging mentioned above also appears when the foreground scene contains transparent objects, whatever the known combining system is used.

OBJECT OF THE INVENTION

The main object of this invention is to obviate the foregoing drawbacks in the known combining systems.

Another object of this invention is to attenuate, or indeed totally eliminate, the reflections and the predominating color in the transparencies having the backing color as the prevailing color in the foreground scene after combination.

SUMMARY OF THE INVENTION

According to the invention, a video signal combining system combines first component video signals and second component video signals into resulting component video signals. The first component video signals are representative of a first color picture including a foreground scene and a backing. The foreground scene to be included in the resulting composite picture represented by the resulting component video signals may be a moving person color picture before a trichromatic backing. The second component video signals are representative of a second picture such as a background picture.

Video processing means mixes predetermined proportions of the first component video signals with a predetermined proportion of one of the second component video signals into third component video signals. Preferably, the second selected component video signal corresponds to a color different from the backing color.

First combining means combines a picture represented by the third component signals in the first composite picture in terms of the color differences of the foreground scene picture and the backing thereby deriving fourth the component video signals. The first combining means determines the picture zones where false colors are created at the transitions between the foreground scene picture and the backing picture. At the transitions, the preponderance of the color backing is then very much attenuated.

Second combining means, analogous to those included in the U.S. Pat. No. 4,292,649, combines signals indicative of a picture represented by the fourth component video signals in said second picture (such as the background picture) in terms of the color differences of the foreground scene picture and the backing to thereby derive the resulting component video signals. As a result of the combining by the second combining means, the colors in the transitions between the foreground scene and the backing or across a transparent object are progressively modified. A viewer can no longer see the edging or the reflections due to the backing but instead see a slight blur perfectly with the colors of the background and foreground scenes.

BRIEF DESCRIPTION OF THE DRAWING

Other objects and features of this invention will become apparent from the following more particular description of preferred embodiments of the invention as illustrated in the accompanying drawing in which:

FIG. 3 is a block diagram of another video signal combining system for processing each picture in the form of three component signals, one of which is a luminance signal and the other two are chrominance signals;

DESCRIPTION OF THE PREFERRED EMBODIMENTS

Figure 1:
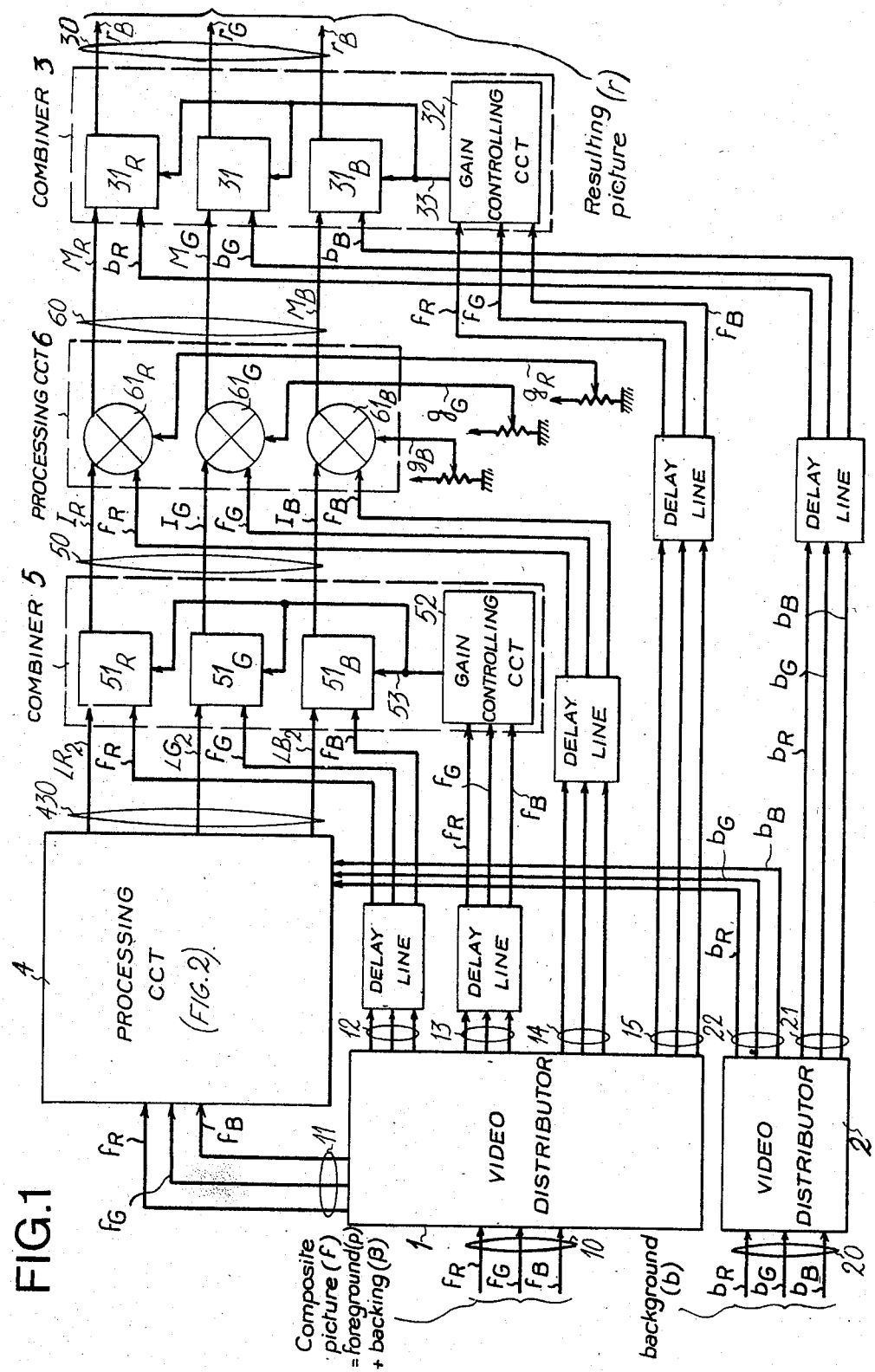
FIG. 1 is a block diagram of a video signal combining system for processing each picture in the form of three primary component signals with three monochromatic colors.

Referring to FIG. 1, a component video signal combining system receives, directly or via video separating means, first separated primary component video signals $f_R$, $f_G$ and $f_B$ representative of a color foreground scene p and backing $\beta$ forming a composite picture f in a first 3-lead input bus 10 from a first video source, and second separated primary component video signals $b_R$, $b_G$ and $b_B$ representative of a color background scene composite picture b in a second 3-lead input bus 20 from a second video source. The indices R, G and B designate the primary component video signals of a color picture ascribed respectively to the colors red, green and blue. The first video source is, for example, a first camera which films a foreground scene picture p, such as an object or person, moving in front of a colored backing $\beta$. In a large number of practical instances, referred to hereafter, the backing $\beta$ consists of a panel and a floor having a saturated uniform color, such as blue. The backing $\beta$ can, however, be trichromatic; in this case, the colorimetric regions of the foreground scene picture p and the backing $\beta$ in the conventional trichometric cartesian coordinate system related to the three monochromatic coordinates R, G and B are substantially disjointed. The second view source is, for example, a second camera, a video tape recorder or a slide projector, which restores the primary component signals of the background scene picture, such as a color landscape.

As is known, the combining system restores in a 3-lead output bus 30 the three primary component signals $r_R$, $r_G$ and $r_B$ of the picture r resulting from the replacement of the backing $\beta$ by the background picture b. The resultant picture r is made up of the person p moving in front of the landscape b.

The three primary component signals $f_R$, $f_G$ and $f_B$ of the composite foreground scene and backing picture in the first input bus 10 are repeated and distributed into five 3-lead buses 11, 12, 13, 14 and 15 by a first primary signal video distributor 1. The three primary component signals $b_R$, $b_G$ and $b_B$ of the background scene picture in the second input bus 20 are repeated and distributed in two 3-lead buses 21 and 22 by a second primary signal video distributor 2.

Besides the two video distributors 1 and 2, the combining system comprises a known first output combiner 3, referred to as a second combining means in the appended claims, and an arrangement which includes a first video processing circuit 4, a second combiner 5 (referred to as a first combining means in the claims); and a second video processing circuit 6 and which is connected between the input video distributors 1, 2 and the output combiner 3.

Apart from the arrangement of circuits 4, 5 and 6 embodying the invention, the combining system is then analogous to those described in U.S. Pat. No. 4,292,649 and recapped below.

Figure 4:
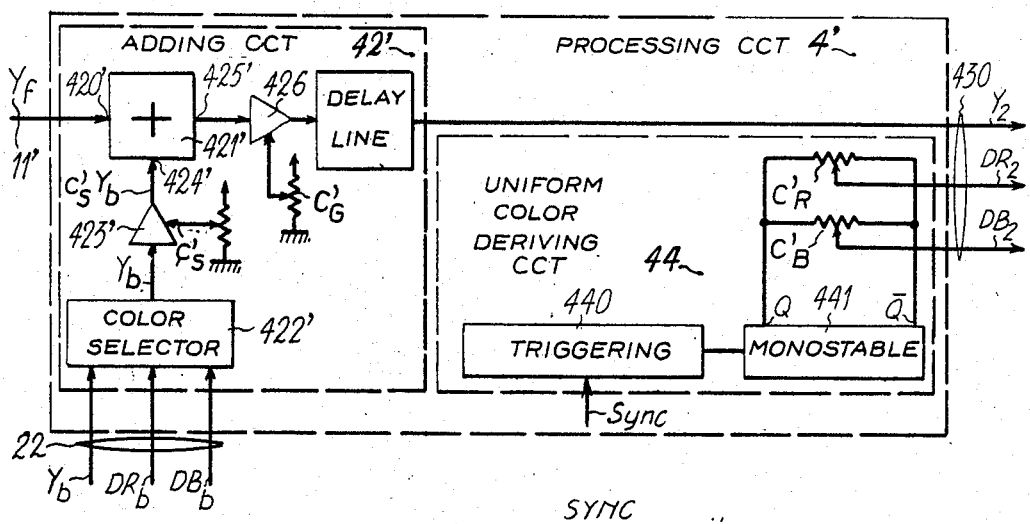
FIG. 4 is a detailed block diagram of the first video processing circuit in FIG. 3.

The combiner 3 comprises three variable gain switching circuits, or variable switching speed switching circuits, $31_R$, $31_G$ and $31_B$. Each of the switching circuits $31_R$, $31_G$ and $31_B$ comprises first and second variable gain amplifiers and an output video mixer. The first variable gain amplifier receives the respective primary signal $f_R$, $f_G$, $f_B$ of the composite foreground scene and backing picture $f = p + \beta$, or more generally, of a picture issued from the foreground scene picture, from the bus 11. The second variable gain amplifier receives the respective primary signal $b_R$, $b_G$, $b_B$ of the background scene picture b from the bus 21. The output mixer of the switching circuit mixes the primary signals derived from the two amplifiers to form the respective primary signal $r_R$, $r_G$, $r_B$ of the resulting picture r. A switching circuit 31 is analogous, for each of the colors red (R), green (G) and blue (B), to the arrangement of respective circuits $5_f$, $5_b$, $52_f$ (e.g. circuits $5_{fG}$, $5_{bG}$ and $52_{fG}$, respectively) and a respective part of the video mixer 6' depicted in FIG. 4 of U.S. Pat. No. 4,292,649.

The combiner 3 further comprises a gain controlling circuit 32 analogous to the circuit 4 shown in FIG. 1 of U.S. Pat. No. 4,292,649. The circuit 32 receives the three primary component signals $f_R$, $f_G$, $f_B$ of the composite foreground scene and backing picture $f = p + \beta$ from the bus 15. Output 33 from the circuit 32 delivers an analog gain controlling signal $\alpha$ which is applied directly to gain control inputs of the second amplifiers in the switching circuits $31_R$, $31_G$ and $31_B$ and, via analog inverter circuits, which supply a reversed signal $(1 - \alpha)$ to gain control inputs of the first amplifiers in the switching circuits $31_R$, $31_G$ and $31_B$.

The analog gain controlling signal $\alpha$ has first and second voltage levels and intermediate voltage levels lying between the first and second levels. The signal $\alpha$ has the first level, termed low level, equal to zero when the composite video signal f consisting of the primary signals $f_R$, $f_G$ and $f_B$ is representative only of the foreground scene picture p, the picture p then being delivered by the first amplifiers of the circuits 31. The signal $\alpha$ has the second level, termed high level equal to unity when the composite video signal f is representative only of the backing picture $\beta$; the backing $\beta$ is not delivered by the first amplifiers of the circuits 31 whereas the signals $b_R$, $b_G$ and $b_B$ representative of the background scene picture b are delivered by the second amplifiers in the circuits 31. An intermediate voltage level of the gain controlling signal $\alpha$ corresponds to a point or picture element in a trichromatic transition region between the backing picture $\beta$ colometric region and the foreground scene p colometric region. The transition region corresponds to a blurred zone, such as that of a transparent object in the picture p through which the backing f can be seen. Thus, in the transition region, for points near the background scene picture, the contribution of the background picture increases because the second amplifiers have a greater gain than the gain of the first amplifiers of the switching circuits 31; reciprocally, the contribution of the foreground scene picture p for points of the transition region close to the colometric region of the picture p increases because the first amplifiers have greater gain than the gain of the second amplifiers of the switching circuits 31.

The circuits 4, 5 and 6 embodying the invention are now described.

Figure 2:
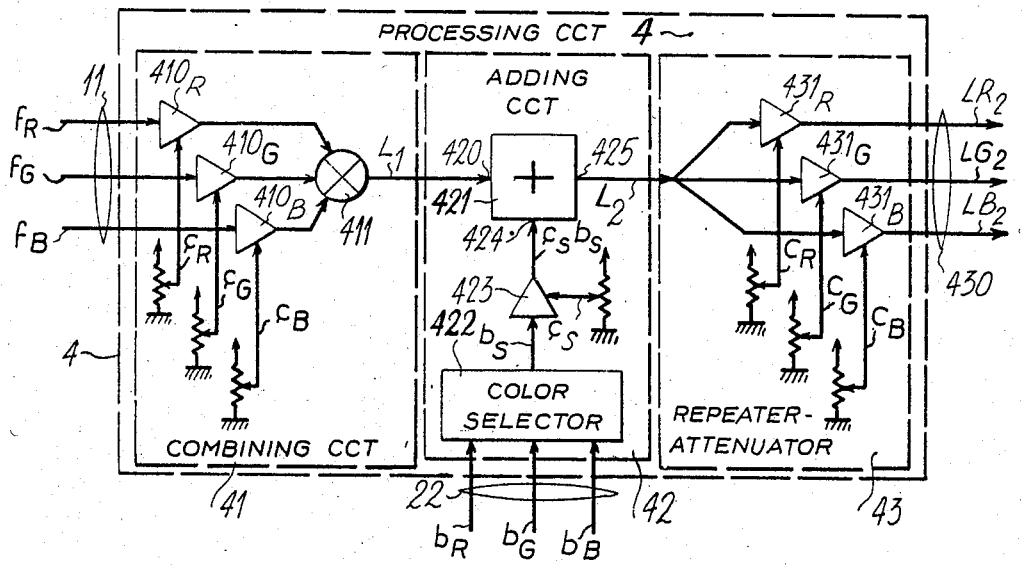
FIG. 2 is a detailed block diagram of the first video processing circuit in FIG. 1.

The function accomplished by the first video processing circuit 4 mainly involves mixing, in adjustable proportions, the amplitudes of certain primary component signals $f_R$, $f_G$ and $f_B$ with an adjustable proportion of the amplitude of one of the signals $b_R$, $b_G$ and $b_B$. As shown in FIG. 2, circuit 4 comprises successively a combining circuit 41 with three inputs, an adding circuit 42 with two inputs and a repeater-attenuator 43 with three outputs. Output 425 of adding circuit 42 delivers a signal $L_2$ resulting from a combination of primary component signals $f_R$, $f_G$ and $f_B$ of the composite foreground and backing picture and one of the primary signals $b_R$, $b_G$ and $b_B$ from the background scene picture. The combining circuit 41 comprises three adjustable attenuators, or amplifiers, $410_R$, $410_G$ and $410_B$ which attenuate the three signals $r_R$, $f_G$ and $f_B$ in the bus 11 with adjustable attenuation factors $c_R$, $c_G$ and $c_B$ respectively. At the output of the combining circuit 41, the three previous attenuated signals are mixed in a mixer 411 into a luminance signal $L_1 = c_R f_R + c_G f_G + c_B f_B$. The signal $L_1$ is applied to input 420 of an adder 421 included in the adding circuit 42. In the adding circuit 42, a color selector 422 receives the primary component signals $b_R$, $b_G$ and $b_B$ of the background scene picture in the bus 22 and selects one of the signals $b_R$, $b_G$ and $b_B$. The selected primary signal $b_s$ is preferably attenuated by a factor $c_s$, or amplified, in a variable attenuator 423 which applies attenuated signal $c_s b_s$ to second input 424 of the adder 421. The output 425 of the adder 421 delivers the luminance signal $L_2 = L_1 + c_s b_s$ to the input on the repeater-attenuator 43. The repeater-attenuator 43 repeats the signal $L_2$ and attenuates, or amplifies, the signal $L_2$ proportionally to three adjustable factors $C_R$, $C_G$ and $C_B$ of variable attenuators or amplifier $431_R$, $431_G$, $431_B$ in order to derive signals $LR_2 = C_R \cdot L_2$, $LG_2 = C_G \cdot L_2$ and $LB_2 = C_B \cdot L_2$ respectively on three separate output leads of a bus 430.

Referring again to FIG. 1, the combiner 5, termed first combining means in the appended claims, is identical to the combiner 3. The combiner 5 comprises three variable gain switching circuits or variable switching speed switching circuits, $51_R$, $51_G$ and $51_B$, together with a gain controlling circuit 52. The first variable gain amplifiers in the circuits $51_R$, $51_G$ and $51_B$ receive the respective luminance signals $LR_2$, $LG_2$ and $LB_2$ on the bus 430 and the second variable primary signals $f_R$, $f_G$ and $f_B$ on the bus 12. The gain controlling circuit 52 receives the primary signals $f_R$, $f_G$ and $f_B$ in the bus 13 and supplies lead 53 with gain controlling signal $\alpha$ to control directly the gains of the second amplifiers in the circuits $51_R$, $51_G$ and $51_B$ and via analog inverter circuits, the gains of the first amplifiers in the circuits $51_R$, $51_G$ and $51_B$.

Respective primary signals $I_R$, $I_G$ and $I_B$, at the outputs of switching circuits $51_R$, $51_G$ and $51_B$ and are applied via a 3-lead bus 50 to first inputs of respective mixers $61_R$, $61_G$ and $61_B$, included in the second processing circuit 6. The other inputs of the mixers $61_R$, $61_G$ and $61_B$ respectively respond to the primary signals $f_R$, $f_G$ and $f_B$ of the composite foreground and backing picture $f = p + \beta$ on the bus 14. Each of mixers $61_R$, $61_G$ and $61_B$ is composed of first and second variable gain amplifiers and an output adder. The first variable gain amplifiers in mixers $61_R$, $61_G$ and $61_B$ respectively respond to the signals $I_R$, $I_G$, $I_B$, as derived from combiner 5. The second variable gain amplifiers in mixers $61_R$, $61_G$ and $61_B$ respectively respond to the respective primary component signal $f_R$, $f_G$, $f_B$ of the composite foreground and backing picture in the bus 14. The component signals $I_R$ and $b_R$, $I_G$ and $b_G$, $I_B$ and $b_B$ are respectively added in the output adders in the mixers $61_R$, $61_G$ and $61_B$ which respectively derive signals $M_R$, $M_G$, $M_B$. The gains $g_R$, $g_G$, $g_B$ of the second amplifiers in the mixers $61_R$, $61_G$, $61_B$ are set by separate potentiometers. An analog inverter circuit in the mixers $61_R$, $61_G$ and $61_R$ provides respectively gains in the first amplifiers equal to $1 - g_R$, $1 - g_G$, $1 - g_B$.

The primary component signals resulting from the above processing operation in the circuit 6 are:

$$M_R = (1 - g_R)I_R + g_R f_R$$

$$M_G = (1 - g_G)I_G + g_G f_G$$

$$M_B = (1 - g_B)I_B + g_B f_B.$$

The signals $M_R$, $M_G$, $M_B$ are applied via a 3-lead bus 60 to the inputs of the first variable gain amplifiers in the respective switching circuits $31_R$, $31_G$, $31_B$ of the output combiner. The inputs of the second variable gain amplifiers in the switching circuits $31_R$, $31_G$ and $31_B$, as already mentioned, receive the primary signals $b_R$, $b_G$ and $b_B$ of the background scene picture in the bus 21.

It is assumed that the foreground scene picture p is filmed by the first camera in front of a saturated blue backing $\beta$. The foreground picture p has red as the main color and contains no saturated blue, save for certain transparent or translucid portions such as a glass or dishevelled hair through which the blue backing is attenuated. The red in the foreground scene picture presents blue reflections that should be eliminated or at least attenuated. In the resulting picture r obtained using a known combining system, i.e. without the circuits 4, 5 and 6, the background scene picture b appears through the transparent portions of the foreground scene picture p with a predominance of blue that should be eliminated.

The first processing circuit 4 is intended for deriving a monochromatic picture stemming from a selected combination of pictures f and b. The combination achieved by the combining circuit 41 differs from the known one for obtaining the luminance signal of any color picture and can be such that:

$c_R = 0.0$; $c_G = 0.6$; $c_B = 0.4$ i.e.

$$L_1 = 0.6 f_G + 0.4 f_B.$$

Added to the luminance signal $L_1$ in the adding circuit 42 is a certain proportion $c_s$ of the red primary signal $b_R$ which is selected by the selector 422; i.e., $b_s = b_R$. The proportion $c_s$ is obtained by adjusting the attenuation in the attenuator, or amplifier, 423 and is equal to 0.5 for the present example. The resulting luminance signal $L_2$ at the output 425 of the adding circuit 42 is thus:

$$L_2 = 0.6 f_G + 0.4 f_B + 0.5 b_R$$

The factors $C_R$, $C_G$, $C_B$ are respectively equal, for instance, to 1.1 and 0.4, such that in the picture represented by the primary component video signals $I_R$, $I_G$ and $I_B$ on the bus 50 and obtained by combining the luminance signals $LR_2$, $LG_2$ and $LB_2$ with the primary component video signals $f_R$, $f_G$ and $f_B$ in the combiner 5, all the transparent portions in the foreground scene p "polluted" by the blue in the backing $\beta$ are replaced by the corresponding zone of a picture with primary components of $LR_2$, $LG_2$, $LB_2$.

Then in the second video processing circuit 6, the gains $g_R$, $g_G$ and $g_B$ of the mixers $61_R$, $61_G$ and $61_B$ are adjusted to depend on the balance of the transition and transparency colors with respect to the preponderant color in the background scene picture b. As already stated, the colometric selection by means of the gain controlling circuit 32 in the output combiner 3 is achieved using the primary signals $f_R$, $f_G$ and $f_B$ representing the composite foreground and backing picture f in the bus 15 in order to replace the blue backing β of the composite picture f by homologous zones of the background picture b. In the zones of the resulting picture representing signal on the bus 30 corresponding to the zones initially "polluted" by the backing, the colors are staggered, and no longer have a predominance of blue, so as to harmonize the transition between the foreground scene colors and the background scene colors with which the foreground scene is combined.

Within the scope of this invention, the combining system as described with reference to FIG. 1 can be modified by those skilled in the art for adaptation to any other colorimetric coordinate system derivable from an R, G, B system by linear relationships. FIG. 3 depicts a combining system embodying the invention that relates to the colorimetric system Y, DR, DB, where Y is the luminance signal and DR and DB are the chrominance signals or otherwise referred to as color difference signals related to red and blue in a composite video signal.

Referring to FIG. 3, the bus 10 supplies the component video signals $Y_f$, $DR_f$ and $DB_f$ of the composite foreground and backing picture to the video distributor 1 which restores the signals $Y_f$, $DR_f$ and $DB_f$ in the 3-lead buses 12, 13, 14 and 15 and which restores the luminance signal $Y_f$ in a single lead 11'. The component signals $Y_b$, $DR_b$ and $DB_b$ of the background scene picture are supplied by the bus 20 to the video distributor 2 which restores the signals $Y_b$, $DR_b$ and $DB_b$ in the buses 11 and 22. The combining system in FIG. 3 comprises a processing circuit 4' substantially different from the circuit 4 in FIG. 2, together with a first combiner 5, a second processing circuit 6 and a second combiner 3 that are identical to those in FIG. 1. In the circuits 5, 6 and 3 in FIG. 3, the component circuits $51_R$, $61_R$, $31_R$ and $51_B$, $61_B$, $31_B$ process the color difference signals related to red and blue, whereas the component circuits $51_G$, $61_G$, $31_G$ process luminance signals. The lay-out of circuits 5, 6 and 3 in FIG. 3 is identical to the lay-out of circuits 5, 6 and 3 in FIG. 1. A detailed description is only be given of the video processing circuit 4' depicted in FIG. 4.

The circuit 4' comprises an adding circuit 42' and a circuit 44' for deriving two uniform colors.

The adding circuit 42' is analogous to the circuit 42 in FIG. 2 and comprises a 2-input adder 421', a color selector 422' and a variable attenuator, or amplifier, 423' respectively set out with respect to each other in the same manner as circuits 421, 422 and 423. The luminance signal $Y_b$ on the lead 11' is fed to input 420' of the adder 421'. On the other input side of the adding circuit 42', the color selector 422' selects the luminance signal $Y_b$ of the background scene picture on the bus 22. The selected luminance signal $Y_b$ is attenuated in the variable attenuator, or amplifier, 423' by an adjustable factor $c'_s$. The signal $c'_s \cdot Y_b$ derived from the attenuator 423' is applied to second input 424' of the adder 421'. Output 425' of the adder 421' is connected to the input of a variable attenuator, or amplifier, 426 having an adjustable attenuation factor $C'_G$. The attenuator 426 supplies, via a lead of the bus 430, a signal $Y_2 = (Y_f + c'_s \cdot Y_b)C'_G$ to the input of the first amplifier in the switching circuit $51_G$ of the combiner 5.

The uniform color deriving circuit 44 comprises an input trigger circuit 440 that receives the line synchronization signal (sync) controlling the processed signals and that produces a pulse for triggering a monostable circuit 441. The pulse derived by the circuit 441 has a width equal to the active portion AP, or visualized portion, of a television line L, following the line blanking signal containing the synchronization pulse for the triggering operation. The pulse level is set by two potentiometers $C'_R$ and $C'_B$, parallel-connected between the complementary inputs Q and $\overline{Q}$ of the monostable circuit 441 so as to produce two signals $DR_2$ and $DB_2$ that are fed to the inputs of the first amplifiers in the switching circuits $51_R$ and $51_B$ via two other leads of the bus 430.

Figure 5:
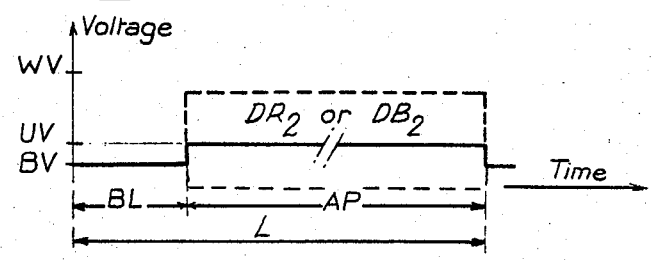
FIG. 5 is a waveform of a steady color difference signal derived by the video processing circuit in FIG. 4.

The waveshape of a signal such as $DR_2$ or $DB_2$ is shown in FIG. 5 and is analogous to a color difference signal with no modulation. For the nominal period of a line L, the signal $DR_2$ or $DB_2$ initially is at the black reference level BV, a level that is maintained throughout the line blanking interval BL; the signal then has a steady level UV throughout the duration of the active portion AP. The steady level UV is set by the respective potentiometer $C'_R$, $C'_B$ and can be lower or higher than the black level. The difference between the steady and black levels can vary upto ±1 volt for a black level equal to 0.3 volts and a white level (WV) equal to 1 volt.

In FIG. 3, the processing continues in the circuits 5, 6 and 3 as in FIG. 1. The resulting picture r' represented by a luminance signal $Y_{r'}$ and color difference signals $DR_{r'}$ and $DB_{r'}$ on the bus 30 at the outputs to circuits $31_G$, $31_R$ and $31_B$ in the combiner 3 is analogous to the picture in FIG. 1. In other words, the resulting picture r' has zones from the foreground scene having a color initially "denaturalized" by the parasitic blue from the backing β replaced by homologous zones from the foreground scene p with colors that have been artificially recreated to harmonize the colors of the foreground p and background b scene pictures when it comes to their transition.

As depicted in FIGS. 1 and 3, the system includes several delay lines connected to buses 12, 13, 14, 15 and 21 for the purpose of synchronizing the component signals transmitted by the video distributions 1 and 2 to the inputs of the circuits 5, 6 and 3, wherein the component video signals have undergone delays due to the preceding processing operations in the respective circuits 4 or 4', 5 and 6.

What I claim is:

1. A system for combining first and second composite video signals into a resulting video signal, said first composite video signal representing a first color picture including a foreground scene picture and a backing and said second composite video signal representing a second color picture, said system comprising:
   first input means responsive to the first component video signals for forming said first composite video signal,
   second input means responsive to the second component video signals for forming said second composite video signal,
   first video processing means for mixing predetermined proportions of said first component video signals with a predetermined proportion of one of said second component video signals to form third component video signals,
   first combining means responsive to said first component video signals and said third component video signals for combining said third component video signals representing a picture in said first picture in terms of color differences of said foreground scene picture and said backing, to thereby derive fourth component video signals, and second means responsive to said fourth component video signals, said second component video signals and said first component video signals for combining said fourth component video signals representing a picture in said second picture in terms of the color differences of said foreground scene picture and said backing, to thereby derive resulting component video signals forming said resulting composite video signal.

2. The system according to claim 1 wherein said first video processing means comprises first means for multiplying said first component video signals by respective adjustable proportion factors, means for mixing component video signals derive from said first multiplying means, means for selecting one of said second component video signals, second means for multiplying said second selected component video signal by an adjustable proportion factor, and means for adding video signals derive from said mixing means and said second multiplying means to derive a luminance signal corresponding to said third component video signals.

3. The system according to claim 2 wherein said first video processing means comprises third means for multiplying said luminance signal by three adjustable proportion factors to derive said third component video signals.

4. The system according to claim 1 wherein said first video processing means comprises means for selecting one of said second component video signals, means for multiplying said second selected component video signal by an adjustable proportion factor, means for adding one of said first component video signals and said video signal derived from said multiplying means to form one third component video signal, means responsive a line synchronizing signal for deriving two component video signals each having an amplitude that is at a black reference level during line blanking intervals and at an adjustable steady level throughout line active portions, to form the other two third component video signals.

5. The system according to claim 4 wherein said deriving means comprises a monostable circuit triggered by said line synchronizing signal, and two potentiometers parallel-connected between complementary outputs of said monostable circuit so as to adjust the steady levels of said other two third component video signals.

6. The system according to claim 4 wherein said first video processing means comprises means for multiplying the signal derived from said adding means by an adjustable proportion factor to derive said third component signal.

7. A system according to claim 1 further comprising second video processing means for mixing said fourth component video signals respectively with said first component video signals to form fifth component video signals, said second combining means combining said fifth component video signals with said second component video signals.

8. The system according to claim 7 wherein said second video processing means comprises, for each pair of fourth and first component video signals to be mixed, means for multiplying the first component video signal of said pair by an adjustable factor, first means for multiplying the fourth component video signal of said pair by a factor proportional to the one's complement of said adjustable factor, and means for mixing the signals derived from said first and second multiplying means to form the fifth respective component video signal.

9. The system according to claim 1 wherein said first and second combining means are identical.

10. A method of deriving a color television picture signal in response to first and second signals respectively representing a picture derived from a foreground scene moving in front of a backing and a background scene comprising the steps of mixing a signal representing a color, as derived from the second signal, with signals representing predetermined colors in the first signal to derive a processed signal, responding to the first processed signal and the first signal to derive a first combined signal which determines picture zones where false colors are created at transition points between the foreground scene and the backing, responding to the combined signal and the first and second signals to derive an output signal wherein transitions between the foreground and background scenes have colors progressively modified such that a viewer of a video display of the signal sees a slight blur blending perfectly with the background and foreground scene colors, rather than the edges or reflections due to the backing.

* * * * *